US007904254B2

(12) United States Patent  (10) Patent No.: US 7,904,254 B2
Ibori et al.  (45) Date of Patent: Mar. 8, 2011

(54) POWER CONVERSION APPARATUS AND METHOD OF ESTIMATING POWER CYCLE LIFE

(75) Inventors: Satoshi Ibori, Yachimata (JP); Tomoya Kamezawa, Narashino (JP); Jiangming Mao, Narashino (JP); Masayuki Hirota, Narashino (JP); Masahiro Hiraga, Yotsukaidou (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 451 days.

(21) Appl. No.: 12/039,979

(22) Filed: Feb. 29, 2008

(65) Prior Publication Data

US 2008/0262750 A1  Oct. 23, 2008

(30) Foreign Application Priority Data

Apr. 20, 2007  (JP) ................................. 2007-111192

(51) Int. Cl.
*G06F 19/00* (2006.01)
*G06F 17/40* (2006.01)
*G08B 23/00* (2006.01)

(52) U.S. Cl. ........... 702/34; 340/588; 340/653; 340/679; 374/102; 374/152; 702/182

(58) Field of Classification Search ................ 324/71.1, 324/71.5; 340/500, 540, 584, 588, 635, 645, 340/646, 653, 654, 679; 374/100, 101, 102, 374/141, 152; 702/1, 33, 34, 127, 130, 132, 702/182, 187, 189
See application file for complete search history.

(56) References Cited

U.S. PATENT DOCUMENTS

| | | | | |
|---|---|---|---|---|
| 3,237,448 A | * | 3/1966 | Howell et al. ................. | 702/132 |
| 3,362,217 A | * | 1/1968 | Evans et al. ................. | 73/112.01 |
| 7,023,172 B2 | | 4/2006 | Katou | |
| 7,176,804 B2 | * | 2/2007 | Norrena et al. ............... | 340/588 |
| 2005/0071090 A1 | * | 3/2005 | Katou ............................ | 702/34 |
| 2005/0197799 A1 | | 9/2005 | Kamezawa et al. | |
| 2005/0212679 A1 | * | 9/2005 | Norrena et al. ............... | 340/588 |
| 2007/0252548 A1 | * | 11/2007 | Moon et al. .................... | 318/434 |

FOREIGN PATENT DOCUMENTS

| | | |
|---|---|---|
| CN | 1618164 | 5/2005 |
| CN | 1664522 | 9/2005 |
| JP | 03-261877 | 11/1991 |
| JP | 6-276755 | 9/1994 |
| JP | 07-135731 | 5/1995 |
| JP | 08-051768 | 2/1996 |
| JP | 2002-101668 | 4/2002 |
| JP | 2002-325463 | 11/2002 |
| JP | 2003-172760 | 6/2003 |
| JP | 2005-252090 | 9/2005 |
| JP | 2005-354812 | 12/2005 |
| JP | 2006-041407 | 2/2006 |
| JP | 2006-166569 | 6/2006 |
| JP | 2006-254574 | 9/2006 |
| KR | 10-0661107 | 12/2006 |

* cited by examiner

*Primary Examiner* — Edward R Cosimano
(74) *Attorney, Agent, or Firm* — Antonelli, Terry, Stout & Kraus, LLP.

(57) ABSTRACT

For applications in a facility where a power conversion apparatus is frequently started and stopped, a power conversion apparatus and a power cycle longevity estimation method are provided which improve an ease of use of the facility. The power conversion apparatus comprises power conversion circuits to supply ac power of variable voltage and variable frequency, a detection circuit to detect a temperature of the power semiconductor in the power conversion circuits, and a computation device to calculate a power cycle longevity of the power semiconductor based on a maximum temperature rise detected by the detection circuit.

20 Claims, 6 Drawing Sheets

POWER CONVERSION APPARATUS AND METHOD OF ESTIMATING POWER CYCLE LIFE

INCORPORATION BY REFERENCE

The present application claims priority from Japanese application JP2007-111192 filed on Apr. 20, 2007, the content of which is hereby incorporated by reference into this application.

BACKGROUND OF THE INVENTION

An inverter, a power conversion apparatus, has found a wide range of applications as a motor speed controller in industrial fields and also with household appliances. Since power semiconductors in the power conversion apparatus generate large losses, the inverter employs a structure that dissipates heat caused by the losses. That is, it has cooling fins and cooling fans so that heat from the power semiconductors as a heat source is transmitted to the cooling fins that in turn exchange heat with air blown to the cooling fins from the cooling fan, thus dissipating heat by an air-cooling method.

In applications where the motor is started and stopped frequently, as with elevators and business washing machines (or coin laundry machines), a so-called power cycle is repeated in which a junction temperature Tj of a chip in a power semiconductor that generates large losses changes from an elevated temperature state (the junction temperature of the silicon chip rises during the operation of the apparatus) to an intermediate temperature state (the junction temperature of the silicon chip lowers while the apparatus is at rest) and to an elevated temperature state (the junction temperature of the silicon chip rises during the operation of the apparatus) again. In such applications a phenomenon is commonly observed in which the power semiconductors fail due to thermal fatigue according to their power cycle longevity.

Power semiconductors are formed of materials with different thermal expansion coefficients (such as silicon chip, copper heat dissipating plate, plastic case and silicon gel), so repetition of thermal expansion and contraction causes thermal stresses in these materials, resulting in disconnection of aluminum bonding wires and cracks in solder, which in turn leads to destruction of the power semiconductors. This phenomenon is called a power cycle.

JP-A-3-261877 discloses a technique that involves estimating a junction temperature of a power semiconductor from an electric current and a temperature of a cooling fin, estimating a degree of fatigue of the power semiconductor using the estimated junction temperature and a power semiconductor operation history calculation means, and displaying a longevity of the power semiconductor when the estimated fatigue value exceeds a predetermined value.

JP-A-7-135731 discloses a technique that involves estimating a junction temperature of a power semiconductor from an electric current, voltage and temperature of a cooling fin, estimating a degree of fatigue of the power semiconductor from the estimated junction temperature, and turning off the power semiconductor when the estimated fatigue value exceeds a predetermined value.

JP-A-8-51768 discloses a technique that involves entering a difference between junction temperatures when an inverter is in operation and at rest, estimating a degree of fatigue of the power semiconductor from a power cycle longevity curve, and turning off the power semiconductor when the estimated fatigue value exceeds a predetermined value.

JP-A-2006-254574 discloses a technique that involves estimating a junction temperature difference of a power semiconductor from an output frequency command value and an output current value and, from a power cycle longevity curve, displaying a remaining percentage of the power cycle longevity of the power semiconductor.

As described above, estimating the junction temperature of a power semiconductor allows the estimation of the degree of fatigue of the power semiconductor and therefore the longevity of power semiconductor parts.

SUMMARY OF THE INVENTION

In applications where start/stop actions are frequently repeated, as with elevators and business washing machines (coin laundry machines), a so-called power cycle is repeated in which a junction temperature Tj of a chip in a power semiconductor that generates large losses changes from an elevated temperature state (the junction temperature of the silicon chip rises during the operation of the apparatus) to an intermediate temperature state (the junction temperature of the silicon chip decreases while the apparatus is at rest) and to an elevated temperature state (the junction temperature of the silicon chip rises during the operation of the apparatus) again. In such applications a phenomenon is commonly observed in which the power semiconductors fail due to thermal fatigue according to their power cycle longevity.

In applications with elevators, in particular, if the power semiconductor is destroyed by thermal fatigue according to its power cycle longevity and the power conversion apparatus fails, the elevator may not operate. So, depending on the application, it is desired to be able to diagnose the power cycle longevity of the power semiconductor.

The patent documents cited above disclose a technique that estimates a junction temperature of the power semiconductor to estimate a degree of fatigue of the power semiconductor and therefore a longevity of parts.

However, the prior art warns of a fatigue of the power semiconductor two or three years after the facility has begun its service, so the operator can only know an imminent failure of the power semiconductor just before the actual occurrence of the failure. That is, during a test operation of a facility conducted at the time of its introduction, it is not possible to estimate the longevity of the power semiconductor from an actual operation pattern, leaving much to be desired in terms of ease of use on the part of the facility.

The present invention has been accomplished with a view to overcoming the aforementioned problems and is intended to improve the ease of use on the part of the facility. It is also an object of this invention to provide a power cycle longevity estimation method that improves the ease of use of the facility.

To achieve the above objectives, the power conversion apparatus of this invention comprises a power conversion circuit to supply ac power of variable voltage and variable frequency, a detection circuit to detect a temperature of a power semiconductor in the power conversion circuit, and a computation device to diagnose a power cycle longevity of the power semiconductor from the detected value of the detection circuit.

A more preferred configuration of the above power conversion apparatus is as follows:

(1) The computation device calculates a power cycle longevity of the power semiconductor based on a maximum temperature rise in a start/stop operation pattern of the power conversion apparatus.

(2) The detection circuit is provided inside the power semiconductor and, based on a temperature detection signal from a temperature sensing element in a power semiconductor module, the power cycle longevity of the power semiconductor is calculated.

(3) The power semiconductor is mounted on a cooling fin. Based on a temperature detection signal from a temperature sensing element installed in the cooling fin, the power cycle longevity of the power semiconductor is calculated.

(4) In the above (2) and (3), the temperature sensing elements in the temperature detection circuit are formed of a thermistor that exhibits resistance proportional to temperature.

(5) A display unit is provided which displays the power cycle longevity in years based on the temperature detected by the detection circuit.

(6) The display unit also displays a temperature difference used in calculating the power cycle longevity in years.

(7) The power conversion apparatus with the display as in (5) and (6) also has an operation panel to set an operation condition of the power conversion apparatus. The display is mounted on the operation panel.

(8) The power conversion apparatus with the operation panel allows an operator to select a test operation mode as the operation condition of the power conversion apparatus from the operation panel.

(9) With the test operation mode selected, an operator is able to set, as the operation condition of the power conversion apparatus from the operation panel, "the number of times that the start/stop action is repeated in a unit time", "operational hours in a day" and "operational days in a year".

To achieve the above objectives, the power cycle longevity estimation method, which diagnoses a power cycle longevity of a power semiconductor installed in a power conversion circuit that supplies an ac power of variable voltage and variable frequency, comprises the steps of: detecting a temperature of the power semiconductor; and calculating the power cycle longevity of the power semiconductor based on a maximum temperature rise determined from the detected temperatures of the power semiconductor.

With this invention, a power conversion apparatus and a power cycle longevity estimation method, both able to improve the ease of use on the part of a facility, can be provided.

Other objects, features and advantages of the invention will become apparent from the following description of the embodiments of the invention taken in conjunction with the accompanying drawings.

DETAILED DESCRIPTION OF THE INVENTION

Figure 1:
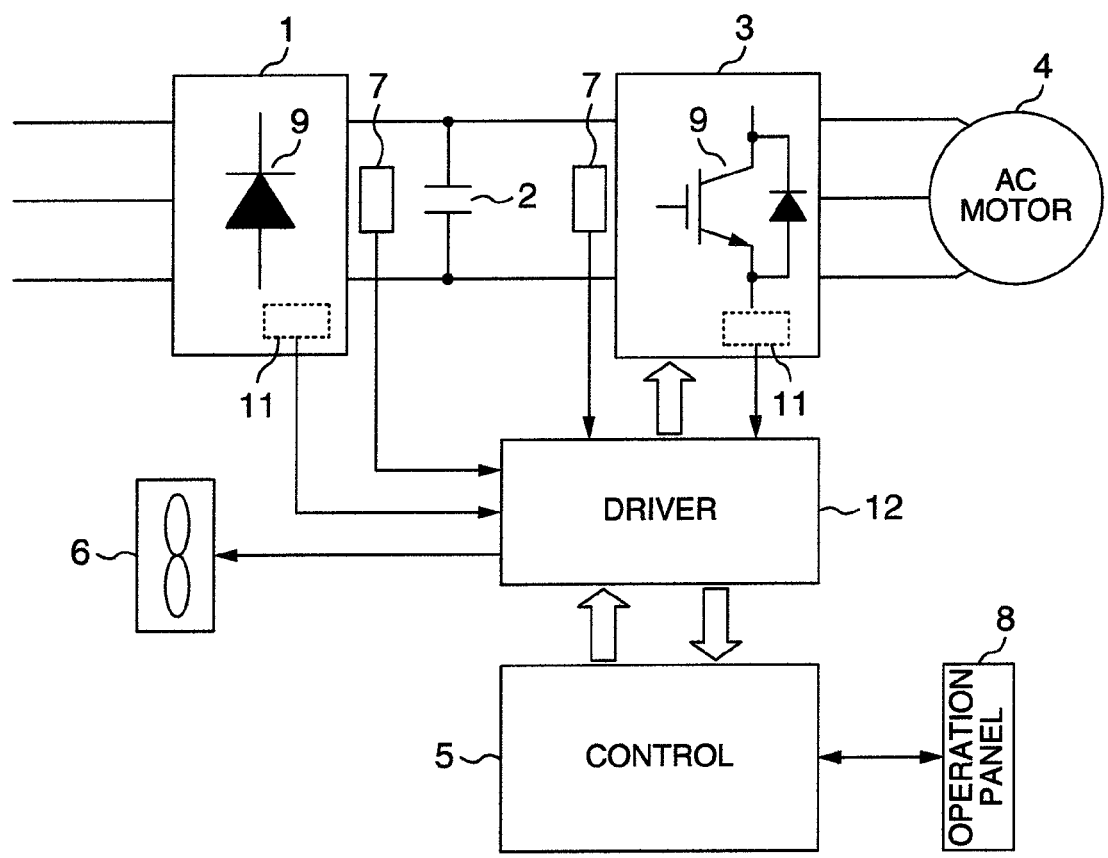
FIG. 1 is a main circuit configuration diagram of a power conversion apparatus.

Now one embodiment of this invention will be described by referring to the accompanying drawings. FIG. 1 is a main circuit configuration diagram of a power conversion apparatus according to one embodiment of this invention. The power conversion circuit of this embodiment comprises a rectifier 1 to commutate an ac voltage of an ac power supply to transform it into a dc voltage, a smoothing capacitor 2 to smooth the dc voltage of the rectifier 1 and an inverter 3 to transform the dc voltage of the rectifier 1 into an ac voltage, and outputs a variable-voltage, variable-frequency ac power to an ac motor 4.

Various control data in the power conversion apparatus of this embodiment can be set and changed from a digital operation panel 8. The digital operation panel 8 is provided with a display unit to display when an abnormal condition occurs.

Power semiconductor modules in the rectifier 1 and the inverter 3 are mounted on cooling fins described later and are air-cooled by a cooling fan 6. A detailed configuration of the power semiconductor modules will be described later. Temperature sensors 7 are mounted on the cooling fins to detect temperatures of the power semiconductor modules in the rectifier 1 and the inverter 3.

A temperature sensor 11 is installed inside the power semiconductor modules near silicon chips. These temperature sensors 7, 11 suitably use thermistors that change their resistance according to temperatures. The thermistor may be one that increases its resistance with a temperature or one that reduces it with an increasing temperature.

A switching element, a power semiconductor, used in the inverter 3 is controlled by a microcomputer-based control circuit 5 which controls the entire power conversion apparatus. More specifically, the control circuit 5 is configured to be able to perform control processing according to various control data entered from the digital operation panel 8. Denoted 12 is a driver circuit that drives the switching element of the inverter 3.

Figure 2:
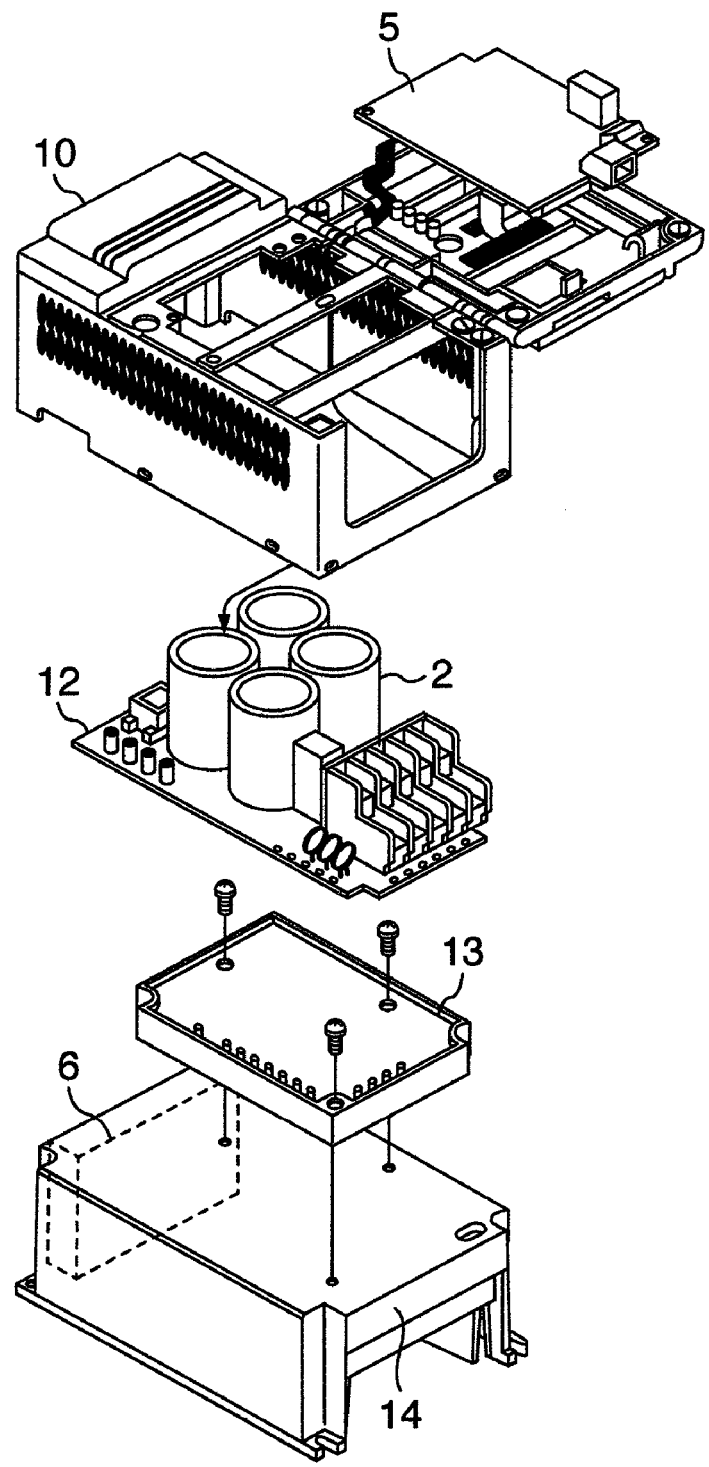
FIG. 2 is an example diagram showing main circuit parts of the power conversion apparatus.

FIG. 2 shows an example arrangement of main circuit parts. A composite module 13, or a collective power semiconductor, having the rectifier 1, the inverter 3 and the temperature sensor 7 installed in one module is mounted on a cooling fin 14, with a cooling fan 6 (shown dotted in the figure) for cooling the cooling fin 14 mounted on an upper surface of the cooling fin. Module 10 houses capacitor 2, control 5 and driver 12.

The composite module 13 configured as a collective power semiconductor causes great losses resulting in heat. The heat produced by the losses is transferred to the cooling fin 14 which is cooled by the cooling fan 6. The cooling fan 6 therefore can protect the composite module 13 or the collective power semiconductor against being overheated.

If an ambient temperature of the power conversion apparatus is abnormally high, a suction air temperature of the cooling fan that draws in the ambient air becomes high, degrading the cooling effect. The power conversion apparatus may be configured so that when the temperature detected by the temperature sensor 7 exceeds a preset temperature, the power conversion apparatus is made to stop and indicate an overheating of the power semiconductor.

In applications where start and stop are repeated frequently, as with elevator and business washing machine (coin laundry machine), a chip inside a power semiconductor that generates large losses repetitively goes through a power cycle in which a junction temperature Tj of the chip changes from an elevated temperature state (the junction temperature of the silicon chip rises when the apparatus is in operation) to an intermediate temperature state (the junction temperature of the silicon chip decreases when the apparatus is at rest) and back again to an elevated temperature state (the junction temperature of the silicon chip rises when the apparatus is in operation). The repetition of the above cyclic change results in the power semiconductor being destroyed by thermal fatigue according to a power cycle longevity even if the power semiconductor is not overheated.

In applications with elevators for example, when a power semiconductor is destroyed by thermal fatigue according to its power cycle longevity, the power conversion apparatus fails, halting the elevator. It is therefore desired that the power cycle longevity of the power semiconductor be able to be diagnosed depending on the application.

The techniques disclosed in the cited patent documents estimate a power cycle longevity of the power semiconductor from the junction temperature. It is thus considered possible that an end-of-life warning may be issued nearly only one year after the facility has entered into operation depending on the operation cycle. That is, there is a problem that it is unpredictable how long the facility will be able to remain in service after it has entered into operation. In a test operation it is not possible to know in advance whether a thermal fatigue failure due to power cycle longevity will occur in a relatively short period of time after the facility has started its operation.

In that case, although a shutdown of the facility can be avoided because an end-of-life warning for the power semiconductor is issued, if a thermal fatigue failure due to power cycle longevity occurs only one year after the facility has entered into service, the facility cannot be regarded as reliable. The problem is that during a test operation of the facility it is not possible to check, in advance, for the possibility of having selected a wrong capacity of the power conversion apparatus.

Figure 3:
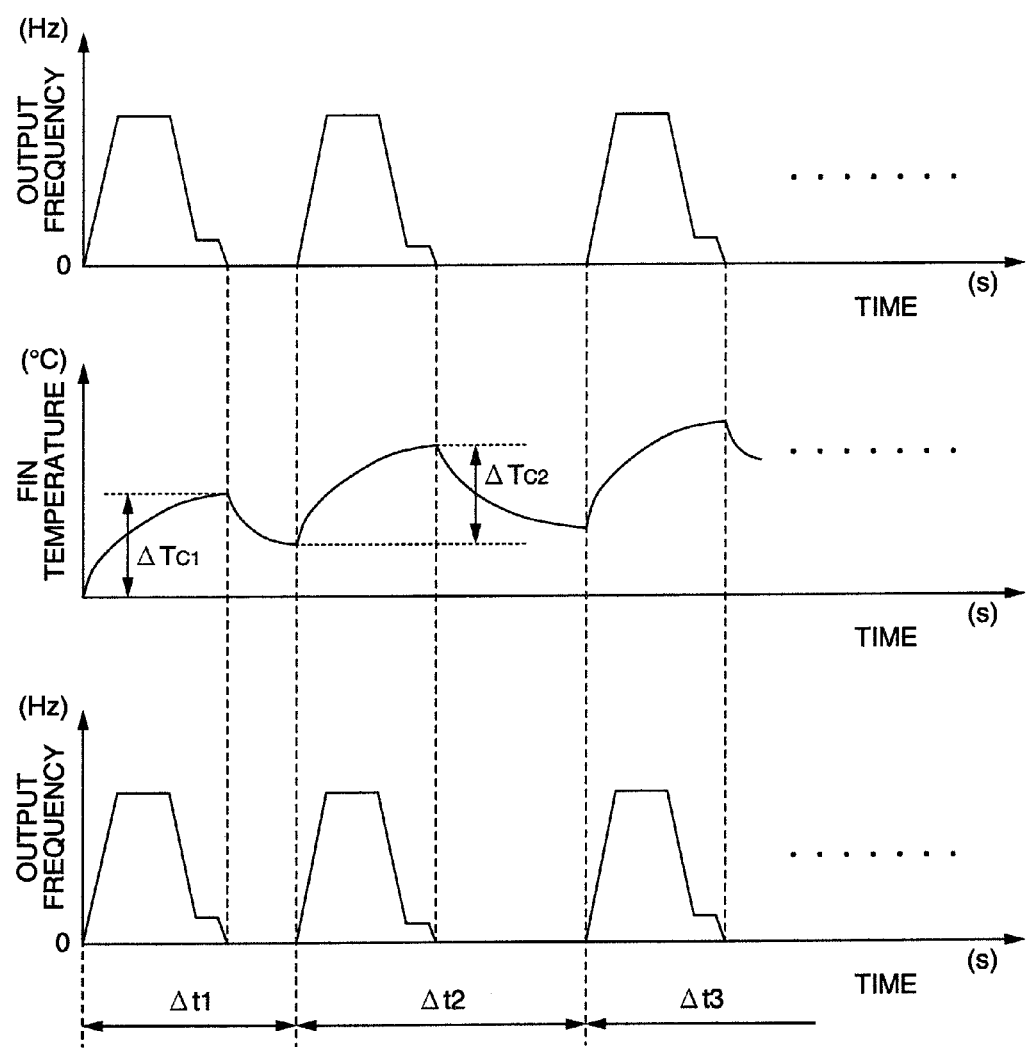
FIG. 3 is a diagram showing an example operation pattern and an example of temperature detected by a temperature sensor.

FIG. 3 shows an example of operation pattern of an elevator that frequently repeats start and stop. A detected temperature of the fin is one that is detected by the temperature sensor 7 mounted on the cooling fin of FIG. 1. When the elevator starts and reaches a destination floor, it stops. At this time a junction temperature Tj of a chip inside the power semiconductor 9 that generates large losses in the power conversion apparatus changes from an elevated temperature state (during operation of the apparatus, the junction temperature of the silicon chip increases) to an intermediate temperature state (when the apparatus is at rest, the silicon chip junction temperature decreases) and back again to the elevated temperature state (the silicon chip junction temperature rises when the apparatus is in operation).

In the operation pattern that frequently repeats the start and stop actions, the chip temperature in the power semiconductor 9 is forced to go through the so-called power cycle repetitively.

In this case, a temperature Tc of the cooling fin that cools the power semiconductor by dissipating heat transmitted from the power semiconductor as a heat source naturally rises and falls in a certain relationship with the chip junction temperature Tj. Monitoring the detected temperature of the temperature sensor 7 on the cooling fin 14 installed near the power semiconductor 9 in this operation pattern makes it possible to predict the number of power cycles allowed in its service life in the operation pattern concerned.

It is of course possible to estimate the chip junction temperature Tj from the cooling fin temperature Tc using the following equation and to predict the number of power cycles allowed in its service life from the junction temperature Tj. It is noted, however, that this does not affect what is intended in this embodiment.

$$Tj = Tc + Rjc * P1$$

where Rjc is a thermal resistance between the junction and the case and P1 is a loss of the power semiconductor 9 in the operation pattern of the power conversion apparatus. This loss P1 can be expressed as follows.

$$P1 = Pon + Poff + Psat$$

where Pon is an on-loss that occurs when the power semiconductor 9 makes a transition from an off-state to an on-state, Poff is an off-loss that occurs when the power semiconductor 9 changes its state from the on-state to the off-state, and Psat is a steady-state loss.

Since detecting and calculating the loss P1 of the power semiconductor 9 is quite difficult, we will explain the method that uses the detected temperature Tc of the cooling fin.

Figure 4:
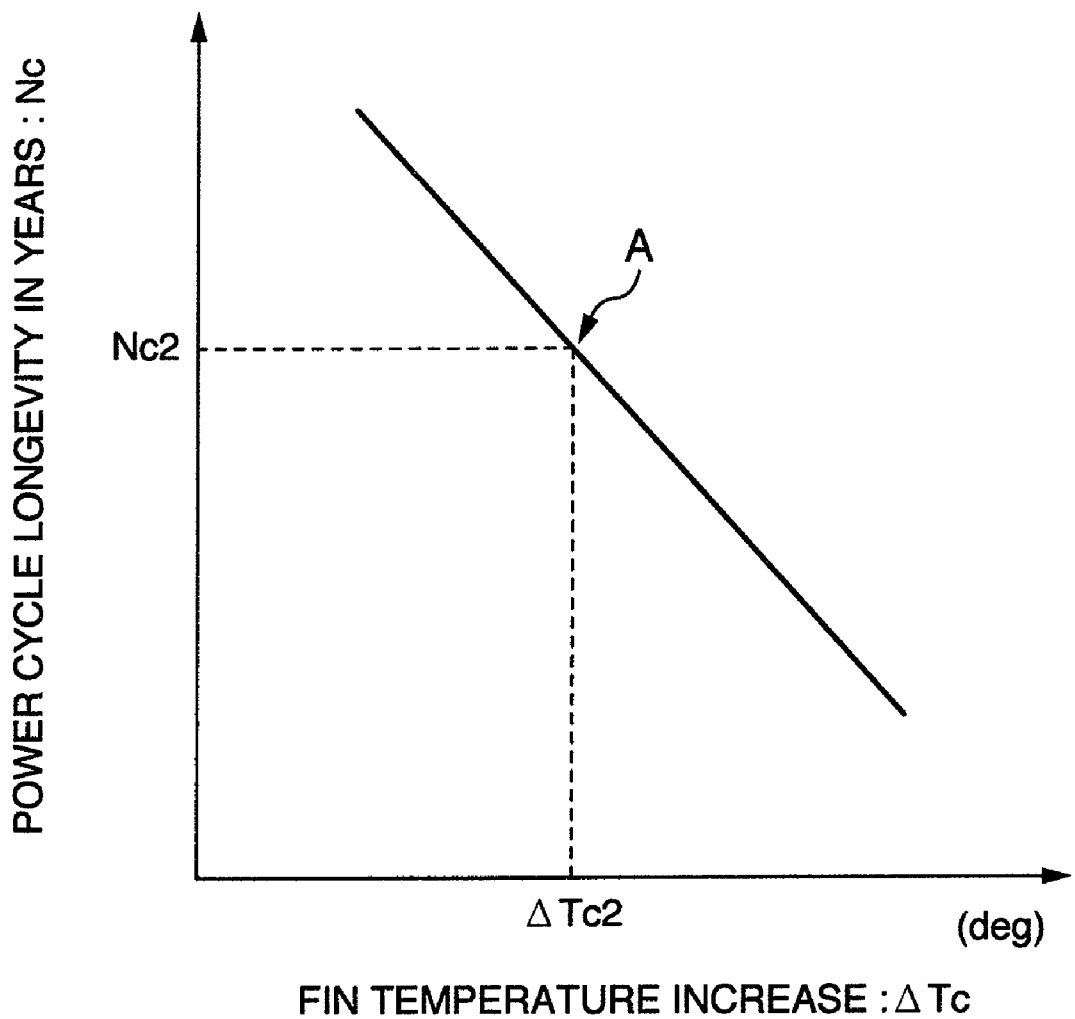
FIG. 4 is a power cycle longevity curve of a power semiconductor.

FIG. 4 shows a power cycle longevity curve of the power semiconductor 9. This longevity curve is characteristic of the power semiconductor and is determined uniquely by a temperature increase of the power semiconductor, not by an ambient temperature of the power semiconductor.

That is, once a temperature increase of the case is determined, the number of available power cycles can easily be read from the power cycle longevity curve.

Consider a case where the number of available power cycles is to be determined for a maximum temperature rise ΔTc2 of the case. In FIG. 4 an intersection A between ΔTc2 and the power cycle longevity curve gives a solution or the number of available cycles.

Let us quantitatively determine the number of longevity power cycles Nc2 by actually substituting the associated values.

An elevator operation pattern cycle for the maximum temperature rise ΔTc2 of the case needs to be determined. Under an operation condition where an operation pattern is repeated once every 15 seconds (which corresponds to ΔT2 in FIG. 3) and continues for 10 hours a day, the number of operation pattern cycles or start/stop actions performed in one year, X, is given by $$X = 60/15 * 60 * 10 * 365 = 876{,}000 \text{ operations/year}$$

where

60/15 is the number of start/stop actions of the elevator performed in one minute;

60/15*60 is the number of start/stop actions of the elevator performed in one hour; and 60/15*60*10 is the number of start/stop actions of the elevator performed in one day.

Suppose that under this condition, the number of longevity power cycles Nc2 for the maximum temperature rise ΔTc2 is 1,000,000 cycles (intersection A in FIG. 4). Under this operation pattern condition, the power cycle longevity in years, Y, for the power semiconductor 9 is given by $$Y = 1{,}000{,}000 / 876{,}000 = 1.1 \text{ years}$$

In other words, if the elevator is operated under the above operation pattern, the power semiconductor 9 will fail by thermal fatigue in as short as slightly more than one year after the elevator has begun its service, halting the operation of the elevator facility.

The techniques disclosed in the cited patent documents estimate the power cycle longevity of a power semiconductor from a junction temperature. So there is a possibility that an end-of-life warning may be issued nearly one year after the initiation of service. That is, these techniques inherently have a problem of being unable, at the time of test operation of the facility, to predict how long the facility will continue to be operational or check for a possibility of the power semiconductor being destroyed by thermal fatigue according to the power cycle longevity in a relatively short period following the start of service of the facility.

In this case, a shutdown of the facility can be avoided because an end-of-life warning for the power semiconductor is issued. But only nearly one year after the initiation of service can an operator recognize from the end-of-life warning signal or the like that the power semiconductor will fail by thermal fatigue according to its power cycle longevity. Such a facility cannot be regarded as reliable. The problem is that during a test operation of the facility it is not possible to check, in advance, for the possibility of having selected a wrong capacity of the power conversion apparatus.

Figure 5:
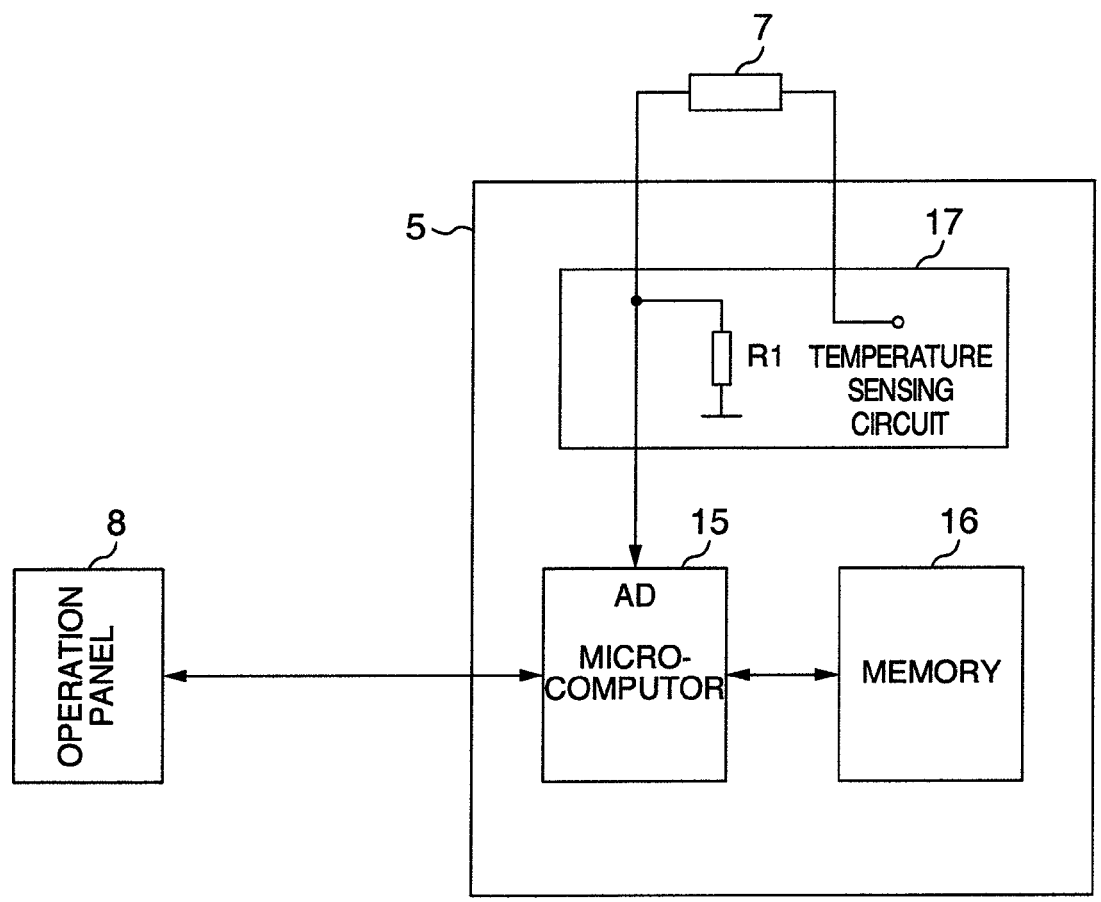
FIG. 5 shows an example diagnosis for predicting when a thermal fatigue caused by power cycles will occur.

FIG. 5 shows an embodiment of a method that is intended to overcome the aforementioned problem and which predicts during a test operation of a facility when a power semiconductor in a power conversion apparatus will fail due to a thermal fatigue according to its power cycle longevity.

Factors required to determine the power cycle longevity in years are as follows:

(1) Provision of a temperature sensing circuit 17 to detect a power semiconductor's maximum temperature rise or difference during an operation period of the facility operation pattern and the next operation period;

(2) Provision of a memory means to store a power cycle longevity curve of a power semiconductor (e.g., a nonvolatile memory 16);

(3) Provision of an operation panel to allow a selection of an operation mode and to set the number of times M that the facility operation pattern can be repeated in a unit time;

(4) Provision of a means which, after the operation pattern repetition number per unit time M has been set from the operation panel, calculates a power cycle longevity in years Y from the power semiconductor's maximum temperature rise or difference and the stored power cycle longevity curve data (e.g., a microcomputer 15); and (5) Provision of an operation panel having a display unit that displays the calculated power cycle longevity in years.

Figure 6:
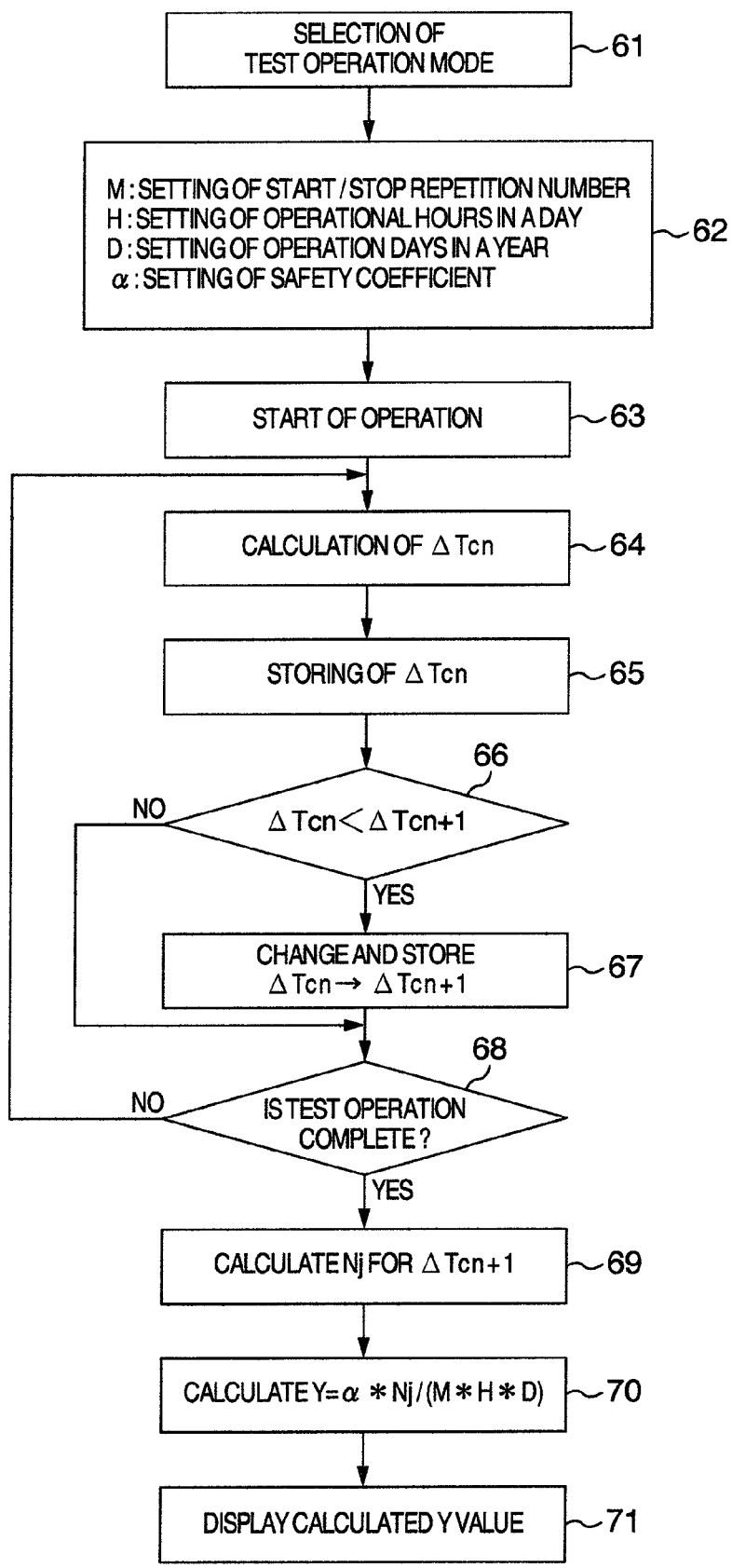
FIG. 6 is an example flow chart of the present invention.

FIG. 6 is a flow chart of this embodiment for the above operation pattern.

In applications where start/stop actions are frequently repeated, as with an elevator, an operator selects a test operation mode on the digital operation panel 8 mounted on the power conversion apparatus during a facility test operation (step 61) and enters into a test operation mode column the number of start/stop actions repeated in a unit time of the test operation M, service hours in a day H and the number of service days in a year D (step 62). In the test operation mode, it is also possible to store a plurality of representative operation patterns in a memory means in advance and select a desired one from among them. Or with these representative operation patterns displayed, an operator may set M, H and D by adjusting the displayed operation pattern.

The test operation is started (step 63) and the start/stop actions are repetitively performed (step 68) until the test operation is complete. At this time, a signal of the temperature sensor 7 installed near the power semiconductor is transmitted to the microcomputer 15 through the temperature sensing circuit 17.

The temperature sensor 7 is a thermistor. A temperature characteristic of the thermistor used will be explained by taking up an example case where its resistance decreases with an increasing temperature.

A thermistor resistance RT at a temperature T is expressed as $$RT = R25 * \exp[B * \{1/(T+273) - 1/(T25+273)\}] \quad (1)$$

where R25 is a thermistor resistance at a temperature of 25° C., T25 is a temperature of 25° C. (T25=25) and B is a constant.

As the thermistor temperature increases, the thermistor resistance RT decreases, which in turn increases by a voltage-dividing resistance R1 an input voltage at an analog port terminal AD of the microcomputer 15. According to this voltage value, the microcomputer calculates the temperature T in real time from the equation (1).

Alternatively, since the equation (1) is complex to calculate, it is possible to determine from the equation (1) data representing a correlation between the input voltage at the analog port terminal AD proportional to the thermistor resistance and the thermistor temperature, store the data in a nonvolatile memory 16 as table data in advance, and then call up the thermistor temperature T from the table data.

A test operation is started in the most stringent operation pattern to calculate a temperature increase $\Delta Tc1$ of the power semiconductor 9 in a start/stop period or operation period $\Delta t1$ shown in FIG. 3 and also a temperature increase $\Delta Tc2$ of the power semiconductor 9 in the next start/stop period $\Delta t2$ (step 64) and hold them (step 65).

Temperature increases $\Delta Tcn$ of the power semiconductor 9 during start/stop periods $\Delta tn$ are calculated successively and the largest $\Delta Tcj$ of these temperature increases $\Delta Tcn$ is held (steps 66, 67) otherwise step 67 is skipped.

Only the first temperature increase $\Delta Tc1$ may be excluded from the largest temperature increase $\Delta Tcj$. That is, the largest temperature increase $\Delta Tcj$ may be picked up and held from among the temperature increases that include the temperature increase $\Delta Tc2$ and subsequent ones.

Here, let us explain why the first temperature increase $\Delta Tc1$ can be excluded.

The composite module 13 has an IGBT chip that constitutes the inverter 3.

A temperature characteristic of the IGBT is a positive feedback. Thus, as the chip temperature increases, a voltage between the chip's collector and emitter, $V_{CEsat}$, increases (positive feedback).

It is of course possible to design the temperature characteristic of the IGBT chip to be of a negative feedback (as the chip temperature rises, the chip's collector-emitter voltage $V_{CEsat}$ decreases).

This temperature characteristic is a design philosophy at the design stage of the IGBT chip.

When, for example, an IGBT module with a rated current of 600 A is to be manufactured, it is evident that connecting three 200-A chips or two 300-A chips in parallel is more advantageous in terms of chip yield than fabricating a single 600-A chip. It is therefore common to connect in parallel a large number of chips with a small rated current to manufacture a module with a high rated current.

In choosing between the positive feedback and the negative feedback for the chip temperature characteristic, the fact that a large number of chips are connected in parallel naturally points to an advantage of designing the chips to have a positive feedback temperature characteristic.

Where two chips are connected in parallel, if the two parallel chips have exactly the same characteristics, electric current flows evenly through the two chips. In reality, however, no two chips exhibit exactly the same characteristics and necessarily there occur characteristic variations.

Suppose two chips with a negative feedback characteristic are connected in parallel. A greater amount of electric current flows through whichever chip has a lower collector-emitter voltage $V_{CEsat}$. As the chip temperature rises because of this current, the collector-emitter voltage $V_{CEsat}$ of the chip in question decreases with an increasing chip temperature because the chips are designed to have a negative feedback characteristic, causing the current in the chip to increase. As a result, the electric current carried by another chip with a higher collector-emitter voltage $V_{CEsat}$ further decreases.

In this situation, although two chips connected in parallel have the same rated current, the currents carried by the two chips are not equal, with only one chip overburdened.

Thus, in designing chip temperature characteristics, it is advantageous to adopt a positive feedback characteristic.

Considering the chip temperature characteristic described above, the first temperature rise ΔTc1 during the test operation, in which the chip temperature is equal to an ambient temperature, cannot be the largest among the temperature rises ΔTcn.

As the chip temperature rises during the process of executing the pattern operation, the loss of the chips progressively increases. Thus it is easily conceived that the temperature increase ΔTcj will become the highest.

From the above discussion, it is shown that the temperature increase ΔTc1 may be eliminated and excluded from the largest temperature increase ΔTcj.

The number of longevity power cycles Nj corresponding to the temperature increase ΔTcj is calculated (step 69) or read out from the power cycle longevity curve data stored in advance in the nonvolatile memory.

It is also possible to have, as a table in the nonvolatile memory 16, data showing a correlation between the power cycle longevity and the temperature and to call up in real time a power cycle longevity for a temperature from this table data.

Next, using the number of start/stop actions repeated in one hour M that was set from the digital operation panel 8, the service hours in one day H and the number of service days in one year D, the power cycle longevity in years Y of the power semiconductor 9 under the above operation pattern condition is calculated from the equation shown below (step 70).

$$Y = \alpha * Nj/(M*H*D)$$

where α is a safety factor (α≦1) that can be set and entered from the digital operation panel 8.

The calculated longevity in years is displayed on a display unit of the digital operation panel 8 (step 71).

Further, the temperature increase ΔTcj can also be displayed on the display unit of the digital operation panel 8.

The above procedure makes it possible to check during a test operation of a facility whether or not the capacity of the power conversion apparatus installed in the facility is correctly chosen.

The number of start/stop actions may be set for a period of one minute, rather than an hour.

If the calculated longevity in years displayed on the operation panel 8 is less than a preset target longevity (for example, 10 years), some measures to cover the target longevity may be taken during the test operation of the facility.

Possible measures that may be taken include:

(1) Lowering a switching frequency of the power conversion apparatus to reduce the generated loss of the power semiconductor;

(2) Increasing the capacity of the power conversion apparatus itself to reduce the temperature rise of the power semiconductor;

(3) Increasing the capacity of the power semiconductor itself in the power conversion apparatus to reduce the temperature rise of the power semiconductor; and (4) Reducing the maximum number of people that can be carried in an elevator to reduce the generated loss of the power semiconductor.

By selecting one of the above measures, the power cycle longevity in years Y of the power semiconductor 9 is determined again in the test operation mode and then further measures to cover the target longevity need to be taken.

With the above embodiment, it can be predicted during a test operation whether or not a failure caused by thermal fatigue according to a power cycle longevity of the power semiconductor will occur in a relatively short period of time after the facility enters into operation.

More specifically, since the power cycle longevity of the power semiconductor can be diagnosed during the test operation of the facility by using a temperature of the power semiconductor in the power conversion apparatus as detected by a temperature sensing circuit and a power cycle longevity curve of the power semiconductor, it can be easily determined when, after the facility enters into service, the power semiconductor or the power conversion apparatus itself needs to be replaced.

Further, since the power cycle longevity can be diagnosed during the test operation of the facility, it is possible to know in advance during the test operation whether or not a failure caused by thermal fatigue according to the power cycle longevity of the power semiconductor will occur in a relatively short period of time after the facility enters into service.

This embodiment allows an operation condition or operation pattern of a power conversion apparatus to be set and entered from the operation panel and also allows the use of a temperature of the power semiconductor as detected by the temperature sensing circuit under the operation condition and of a power cycle longevity curve of the power semiconductor.

In applications where the start/stop of a power conversion apparatus is frequently repeated, this embodiment can estimate during a test operation of a facility the fatigue longevity of a power semiconductor, making it possible to check during the test operation whether or not a failure due to thermal fatigue according to the power cycle longevity will occur in a relatively short period of time after the facility enters into operation. As described above, because a check can be made, during the test operation of a facility, as to an appropriateness in the selection of a capacity of the power conversion apparatus, an operator, when the facility enters into service, can be relieved of an apprehension of a possible failure. This produces effects of improving the ease of use of the facility and of greatly reducing a down time of the facility.

Further, it is possible during the test operation of a facility to predict when a power semiconductor in a power conversion apparatus will fail by thermal fatigue according to the power cycle longevity, the power conversion apparatus being able to supply ac power of variable voltage and variable frequency to an ac motor. This embodiment can therefore be applied to an estimation of power cycle longevity that leads to a significant reduction of a down time of the facility.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A power conversion apparatus comprising:
   a power conversion circuit to supply an ac power of variable voltage and variable frequency;
   a detection circuit to detect a temperature of a power semiconductor in the power conversion circuit; and
   a computation device to diagnose a power cycle longevity of the power semiconductor from a detected value of the detection circuit.

2. A power conversion apparatus according to claim 1, wherein the computation device calculates a power cycle longevity of the power semiconductor based on a maximum temperature rise in a start/stop operation pattern of the power conversion apparatus.

3. A power conversion apparatus according to claim 1, wherein the detection circuit is provided inside the power semiconductor and a temperature detection signal from a temperature sensing element installed inside a power semiconductor module is used to calculate the power cycle longevity of the power semiconductor.

4. A power conversion apparatus according to claim 1, further including a cooling fin having the power semiconductor mounted thereon,
  wherein a temperature detection signal from a temperature sensing element mounted on the cooling fin is used to calculate the power cycle longevity of the power semiconductor.

5. A power conversion apparatus according to claim 1, wherein the detection circuit is provided inside the power semiconductor and a temperature detection signal from a temperature sensing element installed inside a power semiconductor module is used to calculate the power cycle longevity of the power semiconductor;
  wherein the temperature sensing element in the temperature detection circuit is formed of a thermistor that exhibits a resistance proportional to the temperature.

6. A power conversion apparatus according to claim 1, further including a cooling fin having the power semiconductor mounted thereon,
  wherein a temperature detection signal from a temperature sensing element mounted on the cooling fin is used to calculate the power cycle longevity of the power semiconductor;
  wherein the temperature sensing element in the temperature detection circuit is formed of a thermistor that exhibits a resistance proportional to the temperature.

7. A power conversion apparatus according to claim 1, further including a display unit that displays a power cycle longevity in years based on the temperature detected by the detection circuit.

8. A power conversion apparatus according to claim 1, wherein the computing device calculates the power cycle longevity of the power semiconductor based on a maximum temperature rise in a start/stop operation pattern of the power conversion apparatus;
  wherein a display unit is provided which displays the power cycle longevity in years based on the temperature detected by the detection circuit.

9. A power conversion apparatus according to claim 1, wherein the detection circuit is provided inside the power semiconductor and a temperature detection signal from a temperature sensing element installed inside a power semiconductor module is used to calculate the power cycle longevity of the power semiconductor;
  wherein a display unit is provided which displays the power cycle longevity in years based on the temperature detected by the detection circuit.

10. A power conversion apparatus according to claim 1, further including a cooling fin having the power semiconductor mounted thereon,
  wherein a temperature detection signal from a temperature sensing element mounted on the cooling fin is used to calculate the power cycle longevity of the power semiconductor;
  wherein a display unit is provided which displays the power cycle longevity in years based on the temperature detected by the detection circuit.

11. A power conversion apparatus according to claim 1, wherein the detection circuit is provided inside the power semiconductor and a temperature detection signal from a temperature sensing element installed inside a power semiconductor module is used to calculate the power cycle longevity of the power semiconductor;
  wherein the temperature sensing element in the temperature detection circuit is formed of a thermistor that exhibits a resistance proportional to the temperature;
  wherein a display unit is provided which displays the power cycle longevity in years based on the temperature detected by the detection circuit.

12. A power conversion apparatus according to claim 1, further including a cooling fin having the power semiconductor mounted thereon,
  wherein a temperature detection signal from a temperature sensing element mounted on the cooling fin is used to calculate the power cycle longevity of the power semiconductor;
  wherein the temperature sensing element in the temperature detection circuit is formed of a thermistor that exhibits a resistance proportional to the temperature;
  wherein a display unit is provided which displays the power cycle longevity in years based on the temperature detected by the detection circuit.

13. A power conversion apparatus according to claim 1, further including a display unit that displays a power cycle longevity in years based on the temperature detected by the detection circuit and a temperature difference used in calculating the power cycle longevity in years.

14. A power conversion apparatus according to claim 1, further including an operation panel to set the power cycle longevity in years based on the temperature detected by the detection circuit and an operation condition of the power conversion apparatus;
  wherein a display unit is provided in the operation panel.

15. A power conversion apparatus according to claim 1, further including
  a display unit that displays a power cycle longevity in years based on the temperature detected by the detection circuit and a temperature difference used in calculating the power cycle longevity in years and
  an operation panel to set an operation condition of the power conversion apparatus;
  wherein a display unit is provided in the operation panel.

16. A power conversion apparatus according to claim 1, further including an operation panel to set the power cycle longevity in years based on the temperature detected by the detection circuit and an operation condition of the power conversion apparatus;
  wherein a display unit is provided in the operation panel;
  wherein the operation panel can select a test mode as an operation condition of the power conversion apparatus.

17. A power conversion apparatus according to claim 1, further including
  a display unit that displays a power cycle longevity in years based on the temperature detected by the detection circuit and a temperature difference used in calculating the power cycle longevity in years and
  an operation panel to set an operation condition of the power conversion apparatus;
  wherein a display unit is provided in the operation panel;
  wherein the operation panel can select a test mode as an operation condition of the power conversion apparatus.

18. A power conversion apparatus according to claim 1, further including an operation panel to set the power cycle longevity in years based on the temperature detected by the detection circuit and an operation condition of the power conversion apparatus;

wherein a display unit is provided in the operation panel;

wherein the operation panel can select a test mode as an operation condition of the power conversion apparatus;

wherein, when the test mode is selected, the operation panel can be used to set, as the operation condition of the power conversion apparatus, the number of times that a start/stop action is repeated per unit time, operational hours in a day and operational days in a year.

19. A power conversion apparatus according to claim 1, further including a display unit that displays a power cycle longevity in years based on the temperature detected by the detection circuit and a temperature difference used in calculating the power cycle longevity in years and an operation panel to set an operation condition of the power conversion apparatus;

wherein a display unit is provided in the operation panel;

wherein the operation panel can select a test mode as an operation condition of the power conversion apparatus;

wherein, when the test mode is selected, the operation panel can be used to set, as the operation condition of the power conversion apparatus, the number of times that a start/stop action is repeated per unit time, operational hours in a day and operational days in a year.

20. A power cycle longevity estimation method to diagnose a power cycle longevity of a power semiconductor installed in a power conversion circuit that supplies an ac power of variable voltage and variable frequency, the power cycle longevity estimation method comprising the steps of:

detecting a temperature of the power semiconductor; and calculating the power cycle longevity of the power semiconductor based on a maximum temperature rise determined from the detected temperatures of the power semiconductor.

* * * * *